(12) United States Patent
Gould et al.

(10) Patent No.: US 11,276,077 B2
(45) Date of Patent: Mar. 15, 2022

(54) MERCHANT SUGGESTIONS BASED ON A MERCHANT SCORE

(71) Applicant: AMERICAN EXPRESS TRAVEL RELATED SERVICES COMPANY, INC., New York, NY (US)

(72) Inventors: Emily E. Gould, Brooklyn, NY (US); Kristen N. Oldenburger, New York, NY (US); Alice Park, New York, NY (US); Seth M. Ross, New York, NY (US); Mohammad Torkzahrani, Jersey City, NJ (US); Venkat Varadachary, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 134 days.

(21) Appl. No.: 16/429,505

(22) Filed: Jun. 3, 2019

(65) Prior Publication Data
US 2019/0287135 A1 Sep. 19, 2019

Related U.S. Application Data

(63) Continuation of application No. 15/009,606, filed on Jan. 28, 2016, now Pat. No. 10,430,829.
(Continued)

(51) Int. Cl.
*G06Q 30/00* (2012.01)
*G06Q 30/02* (2012.01)
(Continued)

(52) U.S. Cl.
CPC ......... *G06Q 30/0255* (2013.01); *G06F 16/24* (2019.01); *G06F 16/9535* (2019.01);
(Continued)

(58) Field of Classification Search
CPC .......... G06F 16/9535; G06F 16/24578; G06F 16/24; G06Q 30/02; G06Q 30/0269;
(Continued)

(56) References Cited

U.S. PATENT DOCUMENTS

| 9,680,945 B1 | 6/2017 | Treves | |
| 2004/0176966 A1* | 9/2004 | Chen | G06Q 10/087 705/28 |

(Continued)

OTHER PUBLICATIONS

Sheil, Humphrey. Discovering user intent In E-commerce clickstreams. Diss. Cardiff University, 2019.*
(Continued)

*Primary Examiner* — Kathleen Palavecino
(74) *Attorney, Agent, or Firm* — Thomas | Horstemeyer LLP

(57) ABSTRACT

A system may generate a first transaction history from a plurality of records of charge. The system may select a plurality of merchants based on the plurality of records of charge, and generate a first user profile in response to the first transaction history and the plurality of merchants. The first user profile may comprise a merchant score for a merchant appearing in the first transaction history. The first transaction history may include transaction account issuer data. The system may receive a request for content that identifies a user account associated with the first user profile. The system may further generate the content based on the merchant score in response to the request for the content. The request may be automatically generated by the application or may be in response to an action by the first user.

20 Claims, 5 Drawing Sheets

Related U.S. Application Data

(60) Provisional application No. 62/236,684, filed on Oct. 2, 2015.

(51) Int. Cl.
| | | |
|---|---|---|
| *G06Q 30/06* | (2012.01) | |
| *G06F 16/24* | (2019.01) | |
| *G06F 16/9535* | (2019.01) | |
| *G06Q 50/14* | (2012.01) | |

(52) U.S. Cl.
CPC ..... *G06Q 30/0282* (2013.01); *G06Q 30/0625* (2013.01); *G06Q 30/0631* (2013.01); *G06Q 50/14* (2013.01)

(58) Field of Classification Search
CPC ........... G06Q 30/0241; G06Q 30/0255; G06Q 30/0277; G06Q 30/0601; G06Q 10/02; G06Q 30/0201; G06Q 30/0631; G06Q 30/0282; G06Q 30/0625; G06Q 50/14
See application file for complete search history.

(56) References Cited

U.S. PATENT DOCUMENTS

| | | |
|---|---|---|
| 2007/0124698 A1 | 5/2007 | Majumder |
| 2009/0164929 A1 | 6/2009 | Chen |
| 2009/0281875 A1 | 11/2009 | Tarka |
| 2011/0153414 A1 | 6/2011 | Elvekrog |
| 2011/0258049 A1 | 10/2011 | Ramer |
| 2012/0109749 A1 | 5/2012 | Subramanian |
| 2013/0073686 A1 | 3/2013 | Sandholm |
| 2013/0124263 A1 | 5/2013 | Amaro |
| 2013/0246300 A1* | 9/2013 | Fischer .............. G06Q 30/0251 705/347 |
| 2013/0263168 A1 | 10/2013 | Choi |
| 2015/0032768 A1* | 1/2015 | Miller ................. G06F 16/2455 707/769 |
| 2015/0302438 A1* | 10/2015 | Chauhan ............ G06Q 30/0205 705/7.34 |
| 2016/0189253 A1* | 6/2016 | Zamer ................ G06Q 30/0256 705/7.34 |
| 2017/0098242 A1 | 4/2017 | Gould et al. |

OTHER PUBLICATIONS

Non-Final Office Action dated May 6, 2019 in U.S. Appl. No. 15/009,590.
Final Office Action dated Sep. 20, 2019 in U.S. Appl. No. 15/009,590.
USPTO; Non-final Office Action dated Jul. 19, 2018 in U.S. Appl. No. 15/009,590.
Final Office Action dated Feb. 6, 2019 in U.S. Appl. No. 15/009,590.
Non-Final Office Action dated Feb. 23, 2017 in U.S. Appl. No. 15/009,606.
Final Office Action dated Aug. 15, 2017 in U.S. Appl. No. 15/009,606.
Advisory Action dated Oct. 17, 2017 in U.S. Appl. No. 15/009,606.
Non-Final Office Action dated Jul. 25, 2018 in U.S. Appl. No. 15/009,606.
Notice of Allowance dated Feb. 28, 2019 in U.S. Appl. No. 15/009,606.
Yue Sh I et al. Collaborative Filtering beyond the User-Item Matrix: A Survey of the State of the Art and Future Challenges. ACM Computing Surveys, 47(1 ), 3: 1-3:45. https://doi.org/10.1145/2556270 (Year: 2014).

* cited by examiner

MERCHANT SUGGESTIONS BASED ON A MERCHANT SCORE

CROSS REFERENCE TO RELATED APPLICATIONS

This application claims priority to, and the benefit of, U.S. Ser. No. 15/009,606 filed Jan. 28, 2016 and entitled "SYSTEMS AND METHODS FOR GENERATING CURATED AND CUSTOM CONTENT FOR DATA-DRIVEN APPLICATIONS USING CLOSED-LOOP DATA." The '606 application claims priority to, and the benefit of, U.S. Provisional Ser. No. 62/236,684, filed Oct. 2, 2015 and entitled "SYSTEMS AND METHODS FOR GENERATING CURATED AND CUSTOM CONTENT USING CLOSED-LOOP DATA." Both of which are hereby incorporated by reference in their entirety for all purposes.

FIELD

The present disclosure relates to generating curated and/or custom content for a user based on the user's transaction history.

BACKGROUND

Users spend increasing amounts of time online shopping, planning, reading and otherwise looking for content that interests them. The vast majority of content may be of little interest to many users, yet users review volumes of available information to find content of interest to them. Personalization of content available to users may be based on affirmative actions by users that elect to provide such information. However, many users forego the benefits of personalization in light of the associated time and trouble inherent to setting up accounts and/or taking the affirmative actions required to generate more personalized content.

Travel planning is one area where users seek relevant content. Travel planning web sites often include reviews of potential products such as, flights, hotels, dining services, and auto rentals. Certain travel planning web sites also provide reviews typically generated by consumers who have used the product or service being viewed. For a number of reasons, the reviews may not always be reflective of the average experience with the product or service. One reason is that people are most likely to only post reviews in response to more extreme experiences, such as excellent or poor experiences. The average consumer is less likely to post a review than an infuriated or thrilled consumer. Furthermore, existing reviews may cause reviewers to modify their own review, and thereby introduce social influence bias. In some instances, reviews may also be edited or deleted by a review service provider for various reasons. Such modifications may introduce the point of view of a biased third party to a review. Vendors may even post skewed reviews under the guise of a consumer to improve their perceived value. As such, recommendations based on these reviews may not be accurate.

An unbiased, empirical assessment of goods or services may prove difficult for all of the foregoing reasons. Even if the reviews were reliable and unbiased, a particular user may not agree with the reviews when they try the product for themselves. In other words, every consumer is different and the reviews shared are subjective in nature. However, those differences remain difficult to identify on a person-to-person basis.

Instead of reviews, many travel planning services rely on paid advertisement space and generalizations to rank and recommend products for users. However, the travel planning service may seem impersonal and inconvenient to a user based in part on a lack of personal insight. The user may need to engage in the time-consuming process of sifting through voluminous, phonebook-like offerings for products and services associated with their trip in order to locate the ones they want.

SUMMARY

A system, method, and computer readable medium (collectively, the "system") is disclosed for creating custom content from transaction history data, where the transaction history data may include user transaction data in a closed-loop network or other closed-loop data associated with a user. The system may generate a first transaction history from a plurality of records of charge. The processor may be in communication with a memory and a network interface. The system may select a plurality of merchants based on the plurality of records of charge, and generate a first user profile in response to the first transaction history and the plurality of merchants. The first user profile may comprise a merchant score for a merchant appearing in the first transaction history. The first transaction history may include transaction account issuer data, and the first user profile may be stored on a distributed storage system. The system may receive a request for content from an application. The request may identify a user account associated with the first user profile. The system may further generate the content based on the merchant score in response to the request for the content. The request may be automatically generated by the application or may be in response to an action by the first user. The system may also transmit the content to the application for display.

In various embodiments, the system may receive feedback from the application and modify the first user profile and/or the content, in response to the feedback. The feedback may comprise direct feedback (e.g., feedback arising from an affirmative act by the user or a geolocation). The system may also transmit one or more dynamically generated question(s) based on the first user profile and/or a direct request, receive one or more answer(s) to the dynamically generated question, and modify the first user profile and/or the content in response to the answer(s). The system may further generate a second user profile in response to a second transaction history, match the first user profile to the second user profile, and modify the content based on the second user profile. The content may comprise a recommendation for a merchant identified in the second transaction history. The system may match a first merchant profile and a second merchant profile and identify the first merchant profile in the first transaction history. The content may comprise a recommendation for the second merchant profile in response to matching the first merchant profile and the second merchant profile.

The system may receive a selection of a search parameter that identifies a travel preference associated with a user profile that includes a transaction history and/or the transaction history of a look-alike segment. The system may also retrieve a search result matching the travel preference associated with the user profile with the search result including result characteristics derived from closed-loop data and/or third party data. The system may further relate at least one of a good or a service to the search result by identifying a first transaction involving the good or the service and identifying a second transaction involving the search result. The first and the second transaction may be part of the transaction history associated with the user profile.

In various embodiments, the system may refine the search result in response to a user selecting a choice between two or more options. The result characteristics may include popularity with a segment such as, for example, repeat visitors, international travelers, premium travelers, business travelers, and/or domestic travelers. The system may filter the search result in response to the search result matching a user preference matching, wherein the user preference is entered by a user. The system may also receive a second search parameter including an origin location and/or a travel date. The search result may be retrieved by submitting an application programming interface (API) query to a web service that is configured to retrieve the search result from a filesystem maintained on a distributed computing cluster. The system may also select the search result based on the search result appearing in a second transaction history of a second user profile that at least partially matches the user profile.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
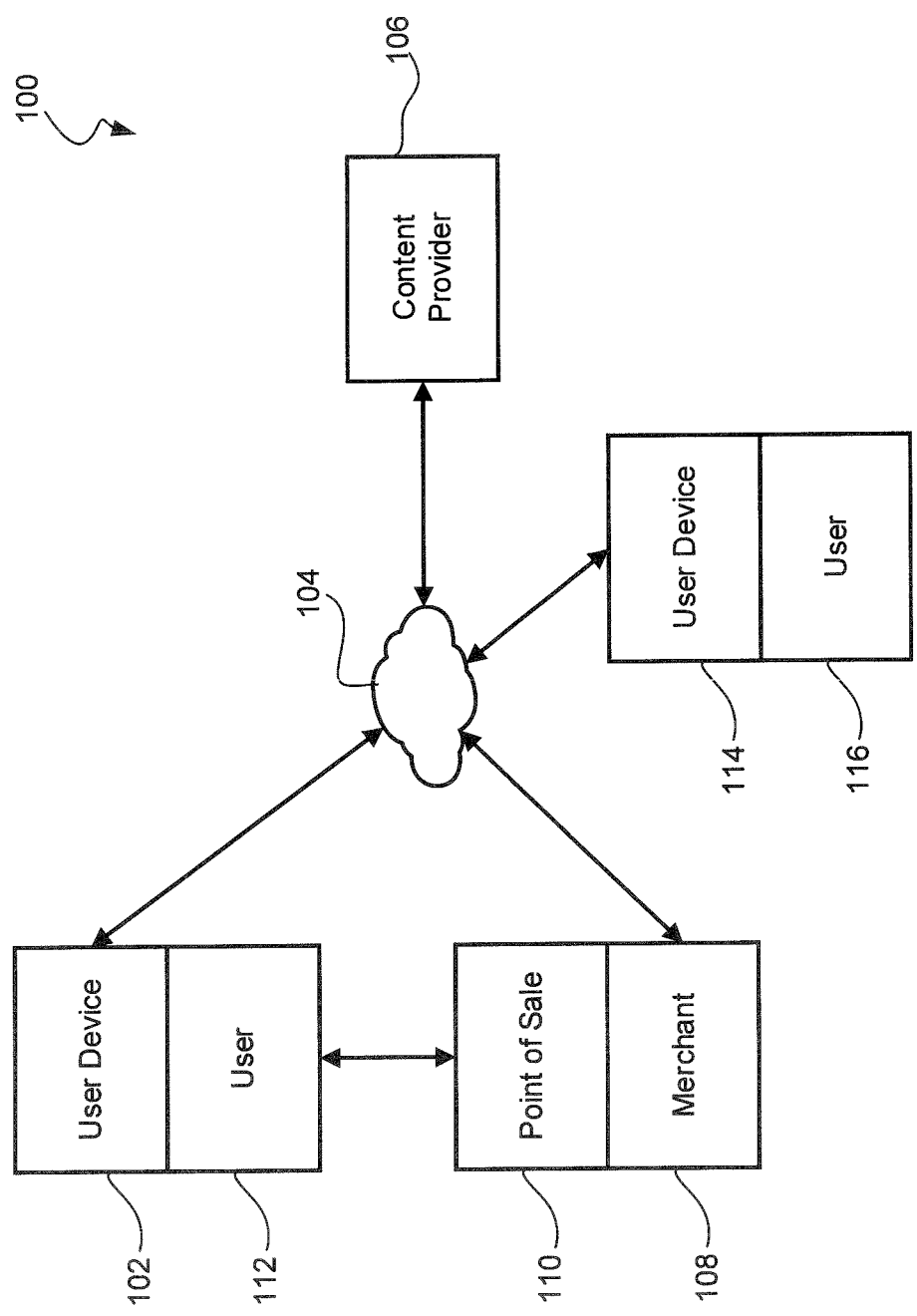
FIG. 1 illustrates an exemplary system for providing a user device with custom and/or curated recommendations based on transaction history, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. For example, a first consumer may match a second consumer in response to the consumers being likely to share interests in a product or service.

The present disclosure provides a system, method, and computer program product for generating and providing custom content (i.e., for an identified user) and/or curated content (i.e., for a set of users) based at least partially on transaction account issuer or closed-loop data. The transaction account issuer data or closed loop data may be generated from, for example, one or more record of charges (ROC). A ROC may comprise any transaction or transaction data. The ROC may be a unique identifier associated with a transaction. A transaction may, in various embodiments, be performed by a one or more users using a transaction account, such as a transaction account associated with a gift card, a debit card, a charge card, a credit card, and the like. A ROC may, in addition, contain details such as location, merchant name or identifier, transaction amount, transaction date, and/or other information relevant to the transaction.

Feedback may also be retrieved from users and weighted based on the type of feedback and relative reliability compared to ROC data or other transaction histories. For example, feedback on products and services may be based on feedback generated directly and/or indirectly based on user behavior and input. The use of closed-loop data may enable consumers to rate locations for which they have verified visits to augment and/or modify the custom suggestions generated on the closed-loop transaction history. The feedback may be integrated into content generation to refine custom content (e.g., suggestions) for the user as well as curated content for other users based on personas and/or look-alike-modeling. The curated data may be based on closed loop data and projected to users that do not have associated closed-loop data. Because the closed-loop data forming the basis of the custom and curated content is objective data based on transaction history rather than unverified opinion, the system of the present disclosure may reduce and/or eliminate bias introduced into content.

With reference to FIG. 1, a system 100 for generating and communicating custom content is shown, in accordance with various embodiments. System 100 includes a user device 102. User device 102 may comprise any device capable of communicating over a network and/or communicating content. For example, user device 102 may take the form of a computer or processor, or a set of computers/processors, such as a computer, laptop, notebook, hand held computer, personal digital assistant, cellular phone, smart phone (e.g., iPhone®, BlackBerry®, Android®, etc.), tablet, wearable (e.g., smart watch and smart glasses), automotive infotainment system, or any other suitable device having user interaction capabilities or dialog capabilities. User device 102 may be in electronic communication with network 104.

In various embodiments, network 104 may be an electronic communication system accomplishing communication among the parties through any suitable communication channels, such as, for example, a telephone network, an extranet, an intranet, Internet, online communications, satellite communications, off-line communications, wireless communications, transponder communications, local area network (LAN), wide area network (WAN), virtual private network (VPN), networked or linked devices, and/or any suitable communication modality. Moreover, although the system may be described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

Communication over network 104 may utilize data encryption to limit vulnerability of network 104 and devices on the network. Encryption may be performed by way of any of the techniques now available in the art or which may become available—e.g., Twofish, RSA, El Gamal, Schorr signature, DSA, PGP, TDEA, AES, ECC, PKI, GPG (GnuPG), and symmetric and asymmetric cryptosystems.

In various embodiments, content provider 106 is in electronic communication with network 104. In that regard, content provider 106 may communicate custom content and curated content to user devices 102. Content provider 106 may maintain client-facing servers in communication with user devices 102. The servers operated by content provider 106 may be, for example, processors, computers, web servers, and/or backend servers configured to generate content and transmit the content to user devices. Users may log into an account using known security means to authenticate a user and tailor content specifically for the authenticated user.

In various embodiments, content provider 106 may be in electronic communication with merchant 108. Merchant 108 may operate a point of sale 110. Point of sale 110 may be a dedicated sales terminal, a computer, a laptop a tablet, a smartphone, a website, an application, or any interface suitable for completing transactions. A user 112 may complete purchase transactions at point of sale 110. The purchase transactions may yield ROC data for a transaction account used to complete the transaction with merchant 108. The ROC data may be used to generate a transaction history for a user 112 based on their transaction account number and ROC data. ROC data may be transmitted to content provider 106 via network 104 to be ingested to support, for example, content generation, profiles, and/or user comparisons to provide content for user device 102 and/or user 112, as well as user device 114 and user 116 that may or may not transact directly with merchant 108.

Figure 2:
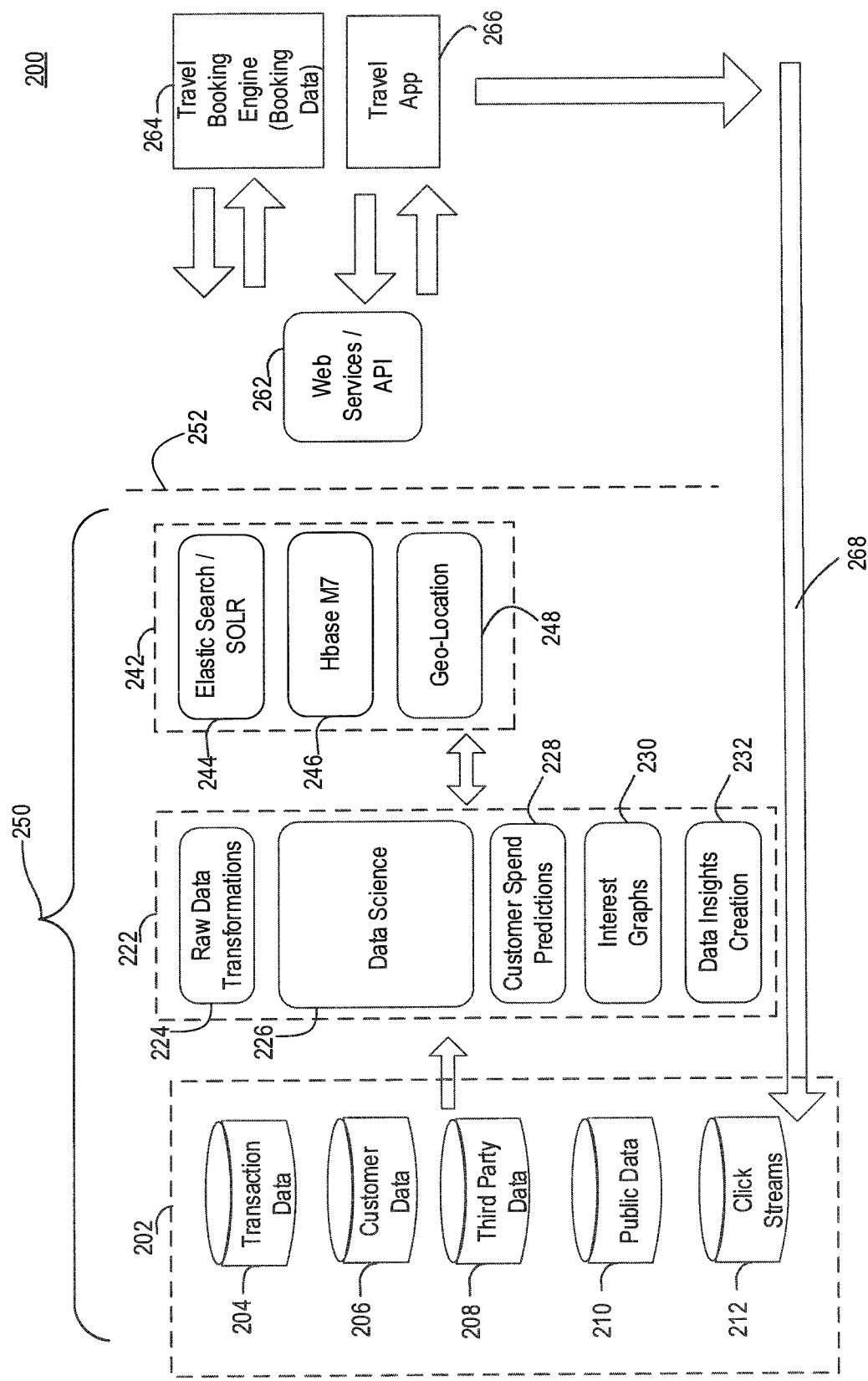
FIG. 2 illustrates an exemplary system for generating and communicating curated and custom content based partially on user feedback, in accordance with various embodiments.

With reference to FIG. 2, system 200 is shown for generating custom and/or curated content based on closed-loop data, in accordance with various embodiments. System 200 may include file system 202. File system 202 may be maintained by content provider 106 using, for example, a distributed computing cluster. The distributed computing cluster may comprise a plurality of computing nodes configured for parallel processing and storage. In that regard, processing and storage tasks may be split among the nodes of the distributed computing cluster to improve throughput and enhance storage capacity. File system 202 of content provider 106 may be maintained on a distributed system configured to process and store big data sets with some of the nodes comprising a distributed file system and some of the nodes comprising a distributed processing system. In that regard, content provider 106 may be configured to operate a Hadoop® cluster, for example, version 2.7.1 as specified by the Apache Software Foundation at http://hadoop.apache.org/docs/.

In various embodiments, data from various data sources may be collected and stored in file system 202 (e.g., a distributed system in a Hadoop® cluster). Data sources ingested into file system 202 may include transaction data 204, customer data 206, third party data 208, public data 210, click streams 212, and other suitable data for generating the desired content. The data may be stored in suitable big data formats for subsequent mapping to help reduce processing.

In various embodiments, transaction data 204 may include years of customer transaction data for US and global markets stored in a secure area. Transaction data 204 may detail each transaction executed using each transaction account maintained by a transaction account provider based on, for example, ROC data. Customer data 206 may include history of customer demographic and account information for the transaction accounts maintained by a transaction account provider. Third party data 208 may include additional data which is obtained or purchased from third parties. Third party data 208 may include third party data products made available by third party providers. Public data 210 may include data that is publicly available and ready to use. Public data 210 may be free or subscription-based. Examples of public data 210 include data available from social media sites (e.g., Facebook® and Twitter®), government sources, or other publicly available data sources.

In various embodiments, click streams 212 may also be incorporated into file system 202 as a form of feedback 268. Click streams may include user feedback, user preferences, user settings, application settings, and other data provided by users. Click streams may include direct user feedback, for example, when a user likes, pins, or comments on a service, product, or merchant. Click streams may also include indirect feedback such as, for example, a user's frequency of purchase and fulfillment with a service, product, or merchant. The system may use click streams 212 to improve custom content based on past history and user interaction with travel application 266, including what a user saw, what a user clicked, when a user clicked, and other user interaction. For example, repeat purchases at a high frequency may indicate a high degree of satisfaction with a service, product, or merchant and thus click streams 212 may revise custom content to include similar services, products, or merchants. File system 202 may maintain the data to support a computational framework 222.

In various embodiments, computational framework 222 provides data transformation and aggregation of the data sources. Computational framework may be maintained on the same distributed computing system (e.g., a Hadoop® cluster) as file system 202. Computational framework 222 may transform the data maintained in file system 202 into data suitable to support a custom content engine. In that regard, computational framework 222 generates and stores derived data for access by real-time database 242. Computational framework 222 may automatically or manually refresh the derived data monthly, weekly, daily, hourly, continuously, or at any other regular or irregular interval, depending on the desired frequency, using batch processing and/or real-time updates.

In various embodiments, computational framework 222 may include raw data transformations 224, data science generation 226, customer spend predictions 228, interest graphs 230, insights creation 232, and other suitable data computation services supporting the custom content engine. Raw data transformations 224 may provide data aggregation and transformation to support data science generation 226 and data insights creation 232. For example, raw data transformations may generate rollup data on a per-user and/or per-merchant basis. Rollup data may thus summarize the transaction history of transaction accounts as well as the transaction history at merchants.

In various embodiments, data science generation 226 may include generating unique user characteristics. In that regard, data science generation 226 may leverage historical transaction data to create customer-to-customer similarity metrics. Data science generation 226 may also include generating personalization and similarity matrices. In that regard, computational framework 222 may create user-to-user and merchant-to-merchant similarity matrices (e.g., item matrices) based on user transaction data using collaborative filtering and custom algorithms. The personalization and similarity matrices may enable custom content for a user based on a similarity with other users.

Data science generation 226 of computational framework 222 may also implement lookalike modeling and segmentation to provide a user with custom content based on her similarity with other users in a same or similar segment. Lookalike modeling and segmentation may enable the expanded application of closed-loop transaction data (describing transaction-account holders) to non-transaction account holders for which no closed-loop transaction data has been generated. In that regard, the users with associated closed-loop data may serve as a seed user set to expand custom content based on the closed-loop data to an expanded user set that includes users without associated closed-loop data.

In various embodiments, similarity metrics measure users relative to one another in various segments. Users may be characterized based on available associated information. Where closed-loop data (e.g., transaction history and/or ROC data) is available for a user, the closed-loop data may be used to generate merchant scores for the user against various merchants, market segments, and/or industries. If desired, the closed-loop data may be used in conjunction with third party data, public data, or feedback to generate the scores. The closed-loop data may include, for example, spend pattern, type of merchants visited, travel preferences, interests, spend frequency, and demographics. The scores may be integrated into a customer vector for comparison with other customers.

Where transaction account issuer or closed loop data is unavailable (e.g., because the user is not a member of the closed-loop network), the user may be scored on third party data, public data, and any past feedback received from the user. Third party and public data may include demographics, home location, and/or other information, but may not include closed-loop data such as transaction history. The scores for these users may also be integrated into a customer vector for comparison with other customers, albeit a potentially less complete vector since closed-loop data is unavailable for the user.

The customer-to-customer similarity metrics enable comparison of one consumer to another consumer to identify similarities. In that regard, a user for which rich, closed-loop data exists may be compared to a user for which closed-loop data does not exist. Fields may be identified in the vectors that indicate similarity between the users, whether or not the users have closed-loop data. Those fields may be compared to find segments of similar users. Custom content and curated content based on closed-loop data may be generated for users without closed-loop data by expanding the closed-loop data from users to the similar users for which closed-loop data does not exist.

For example, User A has closed-loop data, and User B does not. User A and User B match, as they are similar in identified fields of their respective customer vectors. The similarities may be identified using user segments in which users have a common attribute such as zip code, age, or any other user attribute. User B may receive content based on a similarity to User A, such as custom content based on closed-loop data and/or third party data.

In various embodiments, computational framework 222 may further generate customer spend predictions 228. Customer spend predictions 228 may be generated using users' historical transaction data (e.g., data captured in ROCs). Customer spend predictions 228 may identify user spend intent in various industries over a specific period of time based on historical spends in the respective industries. For example, if a user annually spends on a vacation to Brazil in November, the customer spend predictions 228 may identify the user spend intent for a trip to Brazil in the coming November. Customer spend predictions 228 may also map the user profiles with merchant profiles to identify most relevant merchants for each user.

In various embodiments, computational framework 222 may also support interest graphs 230 and insights creation 232. Interest graphs 230 may be based on scores for a user's interests. User interests may be scored based on patterns in the types of merchant visitation displayed in their transaction history. Insights creation 232 may include creating descriptive statistics, rankings, and scores for merchants based on observed trends in merchant visitation (for example, locals "score" and repeat visits "score") that may be presented to users as statistics and/or metrics to assist in service and product evaluation. A merchant may be scored based on its repeat customer base and usage in different segments (e.g., non-account holders, basic account holders, gold account holders may each form a different segment with different spend patterns at the merchant). The statistics may be presented through a travel planning application to help evaluate lodging, flights, dining, or other travel products (e.g., 65% of users that dine at a particular location return to that location, platinum members have a 70% return rate at a merchant, or a 4 out of 5 return rate score). Examples of insights creation 232 may include profiling by spend of premium customers, repeat visits, international visits, duration of visits, or other identifiable data insights. The processed data from computational framework 222 may support real-time database 242.

In various embodiments, real-time database 242 may include all of, or subset of, the processed dataset from file system 202 and/or computational framework 222 to service real-time data requests. Real-time database 242 may be maintained on the same distributed computing system (e.g., a Hadoop® cluster) as file system 202 and computational framework 222. Real-time database 242 may incorporate one or more data platforms to support varying applications. For example, real-time database 242 may include an indexing data platform 244 to provide reliable, scalable, and fault-tolerant distributed indexing. The indexing services may support fast querying and searching through big data sets. Indexing data platform 244 may be implemented using Elasticsearch® and/or SOLR®, for example. Real-time database 242 may also include an interactive data platform 246 that stores and processes data in large volumes via batch processing and also supports interactive and real-time applications. Interactive data platform 246 may be implemented, for example, using Hbase® M7. Real-time database 242 may also comprise a Geo-location data platform 248 with the capability to detect and record where a user is located. The user's geolocation may be used as an input for a query to provide location-based results. Web services 262 may query the various data platforms in real-time database 242 as appropriate to fulfill a request by travel application 266.

In various embodiments, distributed processing system 250 comprising file system 202, computational framework 222, and real-time database 242 may provide backend services to a web application such as travel application 266. Web services 262 may serve as the external communication point, outside of firewall 252. All communications from travel application 266 and/or travel booking engine 264 to real-time database 242 may be facilitated through web services 262. Web services may comprise logic for intelligently responding to requests received from travel application 266. Web services 262 may also comprise an application programming interface (API) to allow travel application 266 and other third party applications to interact with web services 262.

In various embodiments, travel application 266 may make requests for travel information available through a travel booking engine using an API to communicate with web services 262. In response to a request from travel application 266, web services 262 may relay the request to the travel booking engine 264 to retrieve relevant flight, car rental, merchant, and/or hotel availability pertaining to the request. Web services 262 may return the requested results to travel application 266.

In various embodiments, web services 262 may also incorporate user preferences (explicit preferences and implicit preferences derived from feedback) in interpreting search results. In that regard, the hotel, flight, and/or other availability retrieved from travel booking engine 264 may be matched with customer preferences by web services 262 to arrive at appropriate recommendations and/or offers for a particular user of travel application 266, without having to store the booking information in a database.

In various embodiments, travel booking engine 264 may be a third party service providing flight and hotel availability and booking information in real-time. For example, travel booking engine 264 may be implemented using a Global Distribution System (GDS) such as, for example, those maintained by the Sabre Corporation and Amadeus IT Holdings. Travel booking engine 264 may thus facilitate fulfillment of a transaction with the ability to pass any booking information back into the system.

In various embodiments, travel application 266 may be a user-facing application that serves an interactive experience for trip search, planning, booking, feedback based on the transaction history data managed by distributed processing system 250.

Travel application 266 operating with distributed processing system 250 may simplify booking and provide insight derived from closed-loop transaction history data. For example, travel application 266 may shorten the user path to booking by providing data-driven content customized for the user given their query, trip type, and context. For example, travel application 266 may curate trips based on desired trip length and other parameters from the transaction data. A user may enter search parameters that are important to them, and travel application 266 may infer blank criteria based on transaction history and the user's profile or persona. Travel application 266 may also recommend a destination based on a user's past travel behaviors. Travel application 266 may also suggest a particular hotel, destination, flight, etc. based on customer personas (e.g., families, luxury travelers, frequent travelers) absent a direct user query.

In various embodiments, travel application 266 may create data-driven evaluation stats on merchants. For example, travel application 266 may detect that many patrons who stayed at a certain hotel came back a second time. Travel application 266 may use longitudinal commerce behavior and interests to refine search results. For example, a preference for antique goods shopping over golf may correlate with visitation to a particular hotel that is closer to antique shopping areas. Travel application 266 may reference places a user has been to help find new places in the travel destination based on merchant similarity matrices. Travel application 266 may also show restaurants that other people went to when they stayed at a hotel where a user is considering or staying. Travel application 266 may set priorities (e.g., spend more on the flight, less on the hotel, more on food and less on activities) to create contextually relevant suggestions specifically tailored to a user. Travel application 266 may generally provide an experience where the user is able to take into account hotel, flight, and activity choices concurrently rather than having to go through independent experiences.

System 200 may incorporate feedback 268 from users into file system 202, computational framework 222, and/or real-time database 242 to further enhance the closed-loop transaction data used to model consumer preferences. Feedback 268 provided by the user via travel application 266, including likes, clicks, visitation data, and/or fulfillment data, may be ingested back into distributed processing system 250. The feedback may be integrated into the computational framework to modify raw data transformations 224, insights creation 232, models, personalization, and predictions for model enhancements.

In various embodiments, feedback 268 may be permanently stored in file system 202 for use in generating customer profiles during refresh cycles, for example, through batch processing. Feedback 268 may also be integrated into real-time database 242 to provide real-time insight into user behavior.

For example, feedback data in the form of a like, a pin, or a purchase may indicate that a user liked their experience with a merchant, so the feedback may be returned as feedback 268 into, for example, the click streams 212 data source in file system 202. Computational framework 222 may process feedback 268 to determine that the user has a preference for merchants similar to the merchant with which the feedback 268 is associated.

In various embodiments, system 200 may generate dynamic content using feedback 268 and incoming ROC data. For example, system 200 may note that a disproportionately high number of users are currently searching for trips to Barcelona in response to the queries submitted by travel application 266. Travel application 266 may aid users uncertain on a destination by indicating that Barcelona is a trending location. Similarly, system 200 may detect, based on booking history feedback, that an abnormally large number of consumers are traveling on the same day as a user and dynamically suggest that the user should arrive at the airport early.

Figure 3:
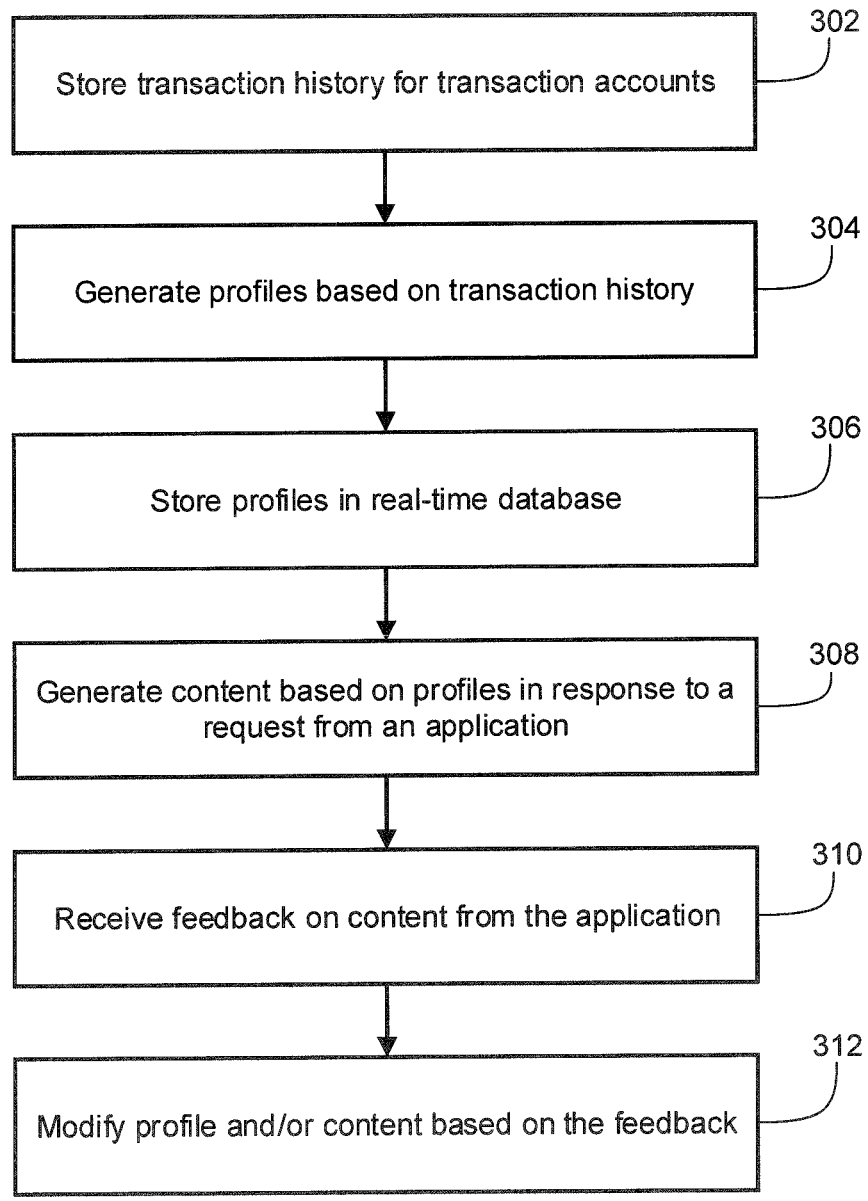
FIG. 3 illustrates a process for modifying data driven content using user feedback, in accordance with various embodiments.

With reference to FIGS. 2 and 3, process 300 for modifying user profiles and/or content in response to feedback is shown, in accordance with various embodiments. Content provider 106 of FIG. 1 may use system 200 of FIG. 2 to perform process 300. Content provider 106 may store transaction history for transaction accounts (Block 302). The transaction history may be stored on distributed processing system 250 to support a user application such as travel application 266, as described above.

In various embodiments, content provider 106 may generate profiles based on the transaction history (Block 304). The profiles may include user profiles as well as merchant profiles. The user profiles may capture details based on the user's transaction history such as the frequency that a user visits various merchants, how often the user travels, the amounts the user spends in various segments over a time period, and other transaction related information. The user profiles may also capture user data originating from non-transaction sources such as the user's home zip code, gender, age, and other details descriptive of the user. The user profiles may be used to create similarity matrices and identify users with similar preferences.

In various embodiments, merchant profiles may also be generated from transaction data by aggregating transaction data of all users that transacted with the merchant using a transaction account. The merchant profile may also be augmented using data from third party sources such as, for example, GDS information providers. The merchant profiles may be used to create similarity matrices and identify merchants having similar characteristics.

In various embodiments, content provider 106 may store the profiles in a real-time database 242 (Block 306). Real-time database may allow content provider 106 to retrieve profiles and generate custom content in real time. Content provider 106 may thus generate content based on profiles in response to a request from an application (Block 308). Content based on the profiles may include recommendations for goods and services that a user may be interested in based on their past history. For example, content provider 106 may look up a user profile indicating that the user has stayed at five hotels over the last year while on trips away outside their home state. Content provider 106 may look up the merchant profiles for the hotels and determine that each of the hotels is a four star hotel. Content provider 106 may generate user specific recommendations for that user profile listing only four star hotels. Content provider 106 may also generate custom queries to refine the user's results. Continuing the above example, content provider 106 may query whether the user prefers a four star hotel for this trip based on their recent history of staying only at four star hotels. The query may be selected from a group of queries and/or custom generated based on the user profile. In the example above, content provider 106 considered the user history of staying at four star hotels to generate the custom query as to whether the user would prefer a four star hotel again. The target questions may thus assist users in arriving at a preferred trip.

In various embodiments, content provider 106 may receive feedback 268 on content from the application (Block 310). Feedback 268 may include direct feedback such as a like, a dislike, a pin, a review, a recommendation, a query response, or other user action that indicates a positive, negative, or indifferent perception of the content by a user. Feedback 268 may also include indirect feedback such as transactions and fulfillment, a click in a screen on an application, time spent viewing a page, and/or the sequence of pages visited. Continuing the above example, the user may answer the query regarding four star hotels by indicating that they do not want a four star hotel for this trip. The user response to the prompted question is direct feedback from the user indicating a negative perception of the four star hotels with respect to the trip they are planning.

In various embodiments, content provider 106 may modify profiles and/or content based on the feedback (Block 312). The feedback may be used to improve the model to yield better content for all users and/or modify the content viewed by the particular user who provided the feedback by adjusting the user's score with various merchants (e.g., in the customer metrics described above). The modification may be dynamically performed to profiles and/or content as appropriate. The feedback may also be stored with the profile and weighted and scored relative to other data to provide an evolving user profile that may be updated in response to a refresh of distributed processing system 250. In that regard, system 200 may be a self-learning system. Continuing the above example, in response to the feedback 268 indicating that the user does not want a four star hotel, content provider 106 may dynamically modify the list of suggested hotels to include three star hotels and exclude four star hotels.

Figure 4:
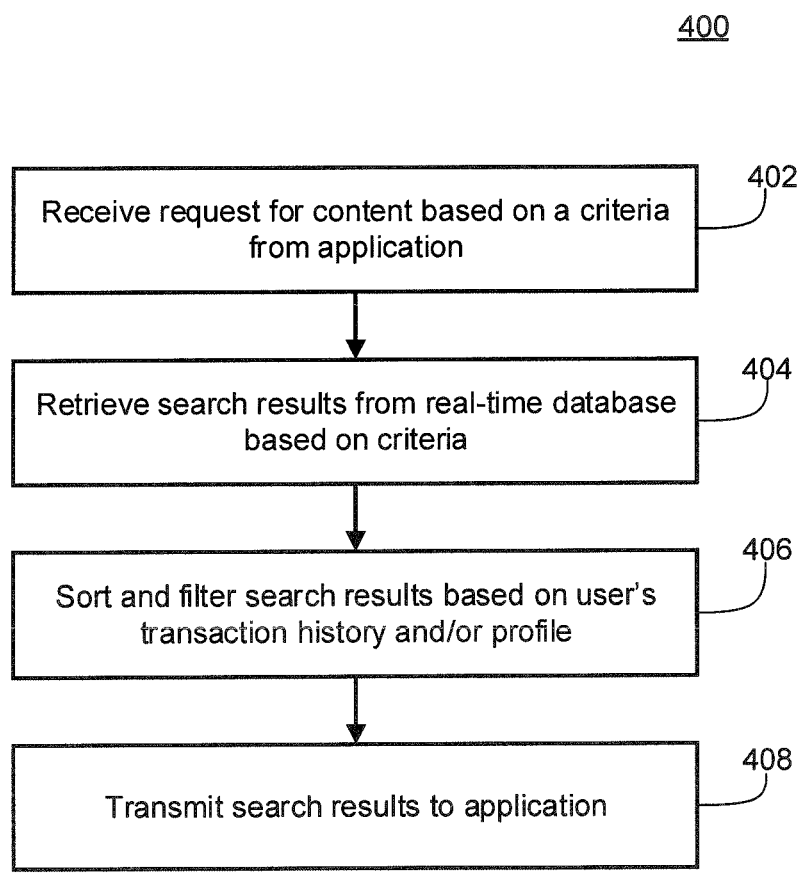
FIG. 4 illustrates a process for making custom travel suggestions for a user based on the user's profile and similar user profiles that are generated from transaction history, in accordance with various embodiments.

With reference to FIGS. 2 and 4, a process 400 is shown for making custom travel suggestions for a user based on the user's profile and similar user profiles that are generated from transaction history, in accordance with various embodiments. Content provider 106 may receive a request for content from an application (Block 402). The request may come from an application such as travel application 266 and may include search criteria entered by the user or criteria submitted by the application to generate content for a page. For example, a user may enter travel dates of 12/13 to 12/21 in travel application 266 and leave the destination field blank. The user may hit a submit button and travel application 266 may submit the request to web services 262. Content provider 106 may receive the query with the entered dates and know that the user is logged in to the requesting application.

In various embodiments, content provider 106 may retrieve search results from real-time database 242 (Block 404). The search results may be retrieved solely on the basis of the criteria, or the criteria may be augmented with data from the user profile prior to retrieving the search results. For example, the user may take a trip to Colorado every winter. Content provider 106 may thus retrieve search results for hotels and air fare for a trip from 12/13 to 12/21.

In various embodiments, content provider 106 may search and sort the search results based on the user's transaction history and/or profile (Block 406). Search results may be sorted (e.g., into ranked lists) by characteristics of importance to the user according to the user profile, which may be partially or wholly generated from the user's transaction history as disclosed above. Results that are unlikely to interest the user may be filtered by default unless the user indicates the filter should be removed. Continuing the above example, content provider 106 may look up the user profile and detect that each of the past five years the user has flown directly into the mountain airport rather than the Denver airport. Content provider 106 may thus filter out flights into Denver and return only flights to the mountain airport. Similarly, content provider 106 may detect that the user has stayed in the same zip code for four of the five historic trips. Content provider 106 may thus present lodging options in the same zip code before lodging options in other zip codes. The user profile may also incorporate feedback from past interaction with travel application 266 that this user sorts from highest price to lowest price 50% of the time and selects one of the top 3 results. Content provider 106 may also compare the user profile to other similar user profiles and find that similar users regularly return to a set of 5 hotels. Content provider 106 may sort trip combinations including the flights into the mountain and lodging at three of the five hotels by descending price. Features such as similarity matrices, item matrices, and ranked lists and their uses are further disclosed in U.S. application Ser. Nos. 13/794,145 and 13/715,770, which are hereby incorporated by reference in their entirety.

In various embodiments, content provider 106 may transmit the search results to the application (Block 408). By ordering and filtering search results based on the transaction history of the user or of a similar user based on profile similarities, travel application 266 may provide the user with relevant results without the user's explicit input. Moreover, by remembering the user's sorting (e.g., descending price) and viewing habits (e.g., the top three results), content provider 106 can tailor the user experience in addition to the content. Travel application 266 using process 400 thus tends to shorten the path to booking and make the user experience less involved for the user by weighing multiple aspects of their trip at the same time, and optimizing suggestions based on hotels and flight availability as well as user preferences.

Figure 5:
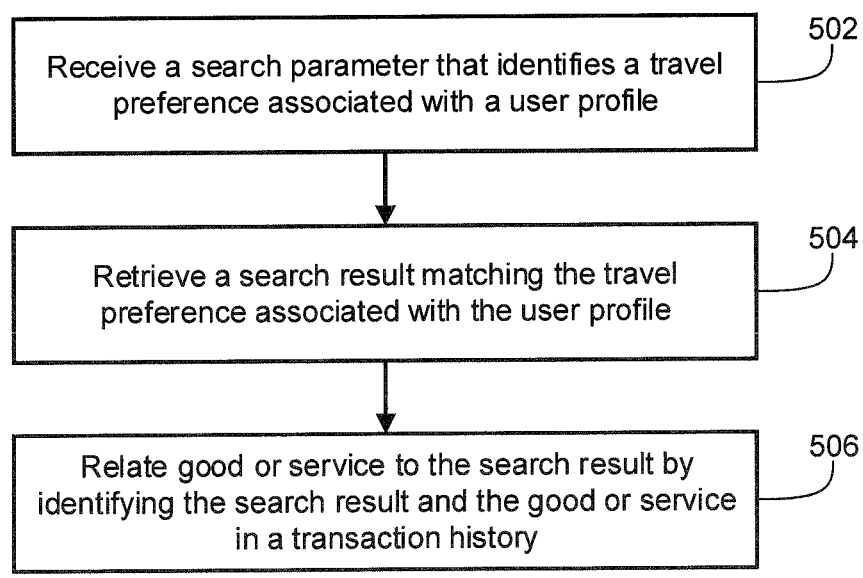
FIG. 5 illustrates an exemplary process for providing a data-driven travel application, in accordance with various embodiments.

In various embodiments, FIG. 5 illustrates a process 500 for providing a data-driven travel application (e.g., travel application 266) configured to interface with system 200 and provide travel search results based on closed-loop data, in accordance with various embodiments. Data may be customized and curated for a user based on a profile associated with user information, such as phone number, email, account number, etc. A travel application may display a search interface on user device 102 for collection of user preferences to begin a travel search for the user (Block 502). The search interface may include a description and selections for presentation on user device 102. Descriptions may include an identifier for the type of information being collected, such as trip type. Selections may include a variety of different subtypes within the identifier. For example, a trip type may include beach, mountain, city, or country trips. A user may select any of the listed selections to provide search parameters. For example, beach may be used as a search parameter in response to a user selecting the corresponding selection for beach.

Travel details may be displayed on user device 102 for collection of search parameters for a trip. Details include a description of the search parameters being collected such as origin location, travel dates, and number of travelers. Origin location may include an airport or a collection of airports selected from a list of airports and/or derived based on user input such as zip code, geo location, home address, or direct location selection by the user. Travel dates may include a departure date and a return date and may be selected on a calendar, entered with text, and/or derived based on past travel history. Traveler numbers may include the number of adults and children traveling and the number of rooms desired, if any, and may be entered with test, entered using counters, and/or derived from past travel history. Other suitable travel preferences may be identified and used as search parameters. The user may run the search by entering the search parameters on user device 102 and pressing a search button. A travel application may retrieve a search result matching the travel preferences associated with the user (Block 504).

A travel application may include a results interface to provide search results in response, in accordance with various embodiments. The results interface may include with an individual result or a list of results. A results interface may thus include one or more search results matching the previously entered search criteria. The search results may be further refined and filtered based on user preferences, past user spend history, user personas, and/or lookalike modeling. Search result may be added to a future trip by the user or passed to view the next result. Result characteristics may include ratings derived from the closed-loop data such as transactions at the merchant corresponding with search result. For example, ratings may include popularity of search result with various segments such as repeat visitors, international travelers, premium travelers, business travelers, domestic travelers, and other segments that may be identified and rated using the closed-loop data.

In various embodiments, the results interface may also include related suggestions. Related suggestions may include goods and/or services commonly consumed by users of search result. For example, transaction history of other users that stay at the hotel identified in the search result may have dined at restaurants identified in related suggestions. A travel application may relate a good and/or service to the search result by identifying the search result and the good and/or service in a transaction history (Block 506). In that regard, related suggestions may be derived from closed-loop data by identifying both a suggested good or service and a search result in one or more of the same transaction history. Third party data and/or booking data may be used to augment the closed-loop data and provide users with improved reviews and insight into products of interest. For example, a group of transaction histories from the closed-loop data may include both a hotel identified in the search result as well as a restaurant identified in related suggest. The type of the restaurant and current room rates, for example, may be determined using third party data to match the closed-loop data.

A travel application may also include a refining interface, in accordance with various embodiments. A refining interface may present one or more choices between alternatives to learn more about user preferences. For example, choices may be a set of binary choices in which a user selects one of two options. Refining interface may enable user device to collect the preferred activities and tailor suggestions for lodging, destination, dining, entertainment, and/or other travel components to the user preferences. For example, a user may indicate a preference to watch a sports match over visiting museums. The travel application may refine search results selecting sports related results rather than museum related results. The selection may be made by using a persona that fits the user to identify sports related interests. The travel application may also determine, based on the closed-loop transaction history of other users, what users having similar preferences chose to do on their trips. The combination of selections made for choices may thus be used to personalize search results and/or related suggestions by providing relevant results.

The travel application may include a filter interface, in accordance with various embodiments. The filter interface may further collect user preferences to identify relevant search results based on closed-loop data and/or third party data. A filter interface may include one or more numeric ranges to refine selections based quantitative characteristics such as price, distance, and duration. Filter interface may also include a list of preference categories to tailor search results to qualitative user preferences.

In various embodiments, users may drill down into preference categories to tailor search results. For example, a user may select a preference category corresponding to personal interests and a list of preferences may expand for the selection. Preferences may include one or more preferences available for user input. Preferences may be selectable, may have further sub-preferences, may include text fields, may include a selection from a list, or any other suitable input for accepting user preferences. For example, the user may select one or more preferences to filter displayed search results that align with the selected preferences. User device 102 may apply the preferences from the filter interface to filter search results.

In various embodiments, a travel application may display refined search results. However, the results and result characteristics displayed in the refined results interface may be tailored to a user using the above described filtering and refinement interfaces to identify user preferences. User preferences may be matched to characteristics of the search results that are derived from closed-loop data.

The systems and methods herein may generate data driven user profiles and merchant profiles from closed-loop transaction data. The profiles and transaction data serve as objective data sources for use in content generation. In the context of travel services, transaction history may enable content providers to fill in blanks for users and streamline trip planning. Content provider 106 may also identify products that will likely be received well by the user based on the user's similarity to other users and the transaction history of the other users. In that regard, systems according to the present disclosure may tend to reduce the role of subjective reviews in evaluating and planning trips. A data-driven application, such as the travel application disclosed above, may interface with the closed-loop data system to further provide users with insight derived from otherwise private closed-loop data.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

A "user profile" or "consumer profile data" may comprise any information or data about a consumer that describes an attribute associated with the consumer (e.g., a preference, an interest, demographic information, personally identifying information, and the like). A user profile may be associated with an account or may be generated for users without accounts.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from ROC, from summaries of charges (SOC), from internal data, or from other suitable sources. Big data sets may be compiled without descriptive metadata such as column types, counts, percentiles, or other interpretive-aid data points.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer systems.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the web services 262 may include application servers (e.g. WEB SPHERE, WEB LOGIC, JBOSS). In various embodiments, the server may include web servers (e.g. APACHE, IIS, GWS, SUN JAVA® SYSTEM WEB SERVER).

User device 102 may include a web client for communication with web services 262. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As used herein, "transmit" may include sending electronic data from one system component to another over a network connection. Additionally, as used herein, "data" may include encompassing information such as commands, queries, files, data for storage, and the like in digital or any other form.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (0 unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    determining, by a processor, merchant statistics for merchants based at least in part on a percent of consumers that return to merchant locations of the merchants;
    profiling, by the processor, spend of the consumers to create spend profiles based at least in part on repeat visits by the consumers to the merchants, and duration of visits by the consumers to the merchant locations;
    generating, by the processor, a merchant score for each of the merchants based at least in part on the merchant statistics, the spend profiles, and merchant-to-merchant similarity matrices;
    displaying, by the processor, a user interface that includes a subset of the merchants that have been identified for a first user based at least in part on the merchant score, wherein the user interface is displayed on a user device;
    receiving, by the processor, user feedback from the user interface displayed on the user device, wherein the user feedback comprises clickstream data associated with a period of time spent viewing content for the subset of the merchants on the user interface and a user-specified sort of the subset of the merchants on the user interface;
    generating, by the processor, an updated merchant score based at least in part on the clickstream data;
    determining, by the processor, a sorting habit for the first user based at least in part on the user-specified sort of the subset of the merchants on the user interface; and
    displaying, by the processor, on the user interface a modified subset of the merchants that is different from the subset of the merchants, wherein the modified subset of the merchants is sorted for display based at least in part on the updated merchant score and the sorting habit.

2. The method of claim 1, wherein the generating of the merchant score is also based at least in part on at least one of a plurality of spend predictions of the first user, a first profile of the first user based at least in part on first user data, merchant profiles, spend patterns of the first user, types of merchants visited by the first user, travel preferences of the first user, interests of the first user, spend frequency of the first user, and historical demographic data of the first user, records of charge, historical account information of the first user, third party data, social media data, government data, settings of the first user, application settings of the first user, or interaction data of the first user.

3. The method of claim 1, further comprising determining, by the processor and using first user data for the first user, first user interests based at least in part on patterns in types of merchant visitation displayed in a first transaction history of the first user data.

4. The method of claim 1, further comprising creating, by the processor, interest scores for interests of the first user.

5. The method of claim 1, further comprising providing, by the processor, data transformations of at least a portion of first user data for the first user, wherein the data transformations include at least one of raw data transformations, custom content, a plurality of spend predictions of the first user, interest scores, the merchant score, the merchant statistics, and the spend profiles.

6. The method of claim 1, further comprising generating, by the processor, second user characteristics for a second user based at least in part on similarity matrices with the first user by using transaction data of the first user and collaborative filtering.

7. The method of claim 1, further comprising determining, by the processor, that a second user has attributes similar to the first user based at least in part on similarity matrices.

8. The method of claim 1, further comprising implementing, by the processor, lookalike modeling and segmentation to provide a second user with the subset of the merchants based at least in part on similarity with the first user in a same segment.

9. The method of claim 1, further comprising creating, by the processor, the merchant-to-merchant similarity matrices based at least in part on transaction data of the first user, collaborative filtering, and algorithms.

10. The method of claim 1, further comprising generating, by the processor, a refined subset of the merchants from the modified subset of the merchants in response to the first user selecting a characteristic associated with the modified subset of the merchants.

11. The method of claim 1, further comprising searching, by the processor, for the subset of the merchants based at least in part on a popularity with a segment of consumers including at least one of repeat visitors, international travelers, premium travelers, business travelers, or domestic travelers.

12. The method of claim 1, further comprising searching, by the processor, for the subset of the merchants based at least in part on the subset of the merchants appearing in a second transaction history of a second profile of a second user, wherein the second profile at least partially matches a first profile for the first user.

13. The method of claim 1, further comprising:
receiving, by the processor, a search parameter that identifies a travel preference associated with a first profile for the first user;
retrieving, by the processor, a search result matching the travel preference associated with the first profile;
sorting, by the processor, the search result to create a sorted search result based at least in part on search result characteristics of importance to the first user according to the first profile; and
providing, by the processor and via a travel application, the sorted search result to the first user.

14. The method of claim 1, further comprising:
generating, by the processor, a plurality of spend predictions for the first user based at least in part on transaction data for the first user;
generating, by the processor, a first profile for the first user based at least in part on first user data for the first user; and
mapping, by the processor using the plurality of spend predictions of the first user, the first profile with a plurality of merchant profiles to identify the subset of the merchants for the first user.

15. A computer-based system, comprising:
a computing device that includes a processor; and
a tangible, non-transitory memory configured to communicate with the processor, the tangible, non-transitory memory having instructions stored thereon that, in response to execution by the processor, cause the computing device to at least:
determine merchant statistics for merchants based at least in part on a percent of consumers that return to merchant locations of the merchants;
profile spend of the consumers to create spend profiles based at least in part on repeat visits by the consumers to the merchants, and duration of visits by the consumers to the merchant locations;
generate a merchant score for each of the merchants based at least in part on the merchant statistics, the spend profiles, and merchant-to-merchant similarity matrices;
display a user interface that includes a subset of the merchants that have been identified for a first user based at least in part on the merchant score, wherein the user interface is displayed on a user device;
receive user feedback from the user interface displayed on the user device, wherein the user feedback comprises clickstream data associated with a period of time spent viewing content for the subset of the merchants on the user interface and a user-specified sort of the subset of the merchants on the user interface;
generate an updated merchant score based at least in part on the clickstream data;
determining, by the processor, a sorting habit based at least in part on the user-specified sort of the subset of the merchants on the user interface; and
display on the user interface a modified subset of the merchants that is different from the subset of the merchants, wherein the modified subset of the merchants is sorted for display based at least in part on the updated merchant score and the sorting habit.

16. The system of claim 15, wherein the instructions, in response to execution by the processor, further cause the computing device to at least:
receive a search parameter that identifies a travel preference associated with a first profile for the first user;
retrieve a search result matching the travel preference associated with the first profile;
sort the search result to create a sorted search result based at least in part on search result characteristics of importance to the first user according to the first profile; and
provide, via a travel application, the sorted search result to the first user.

17. The system of claim 15, wherein the instructions, in response to execution by the processor, further cause the computing device to at least:
generate a plurality of spend predictions for the first user based at least in part on transaction data for the first user;
generate a first profile for the first user based at least in part on first user data for the first user; and
map, by using the plurality of spend predictions of the first user, the first profile with a plurality of merchant profiles to identify the subset of the merchants for the first user.

18. The system of claim 17, wherein the instructions, in response to execution by the processor, further cause the computing device to at least search for the subset of the merchants based at least in part on the subset of the merchants appearing in a second transaction history of a second profile of a second user, wherein the second profile at least partially matches the first profile.

19. An article of manufacture including a non-transitory, tangible computer readable storage medium having instructions stored thereon that, in response to execution by a processor of a computing device, cause the computing device to at least:
determine merchant statistics for merchants based at least in part on a percent of consumers that return to merchant locations of the merchants;

profile spend of the consumers to create spend profiles based at least in part on repeat visits by the consumers to the merchants, and duration of visits by the consumers to the merchant locations;

generate a merchant score for each of the merchants based at least in part on the merchant statistics, the spend profiles, and merchant-to-merchant similarity matrices;

display a user interface that includes a subset of the merchants that have been identified for a first user based at least in part on the merchant score, wherein the user interface is displayed on a user device;

receive user feedback from the user interface displayed on the user device, wherein the user feedback comprises clickstream data associated with a period of time spent viewing content for the subset of the merchants on the user interface and a user-specified sort of the subset of the merchants on the user interface;

generate an updated merchant score based at least in part on the clickstream data;

determine a sorting habit based at least in part on the user-specified sort of the subset of the merchants on the user interface; and display on the user interface a modified subset of the merchants that is different from the subset of the merchants, wherein the modified subset of the merchants is sorted for display based at least in part on the updated merchant score and the sorting habit.

20. The article of manufacture of claim 19, wherein the instructions stored thereon that, in response to execution by a processor of a computing device, cause the computing device to at least:

generate the merchant-to-merchant similarity matrices based at least in part on user transaction data.

* * * * *